(12) United States Patent
Johansson et al.

(10) Patent No.: US 7,017,861 B1
(45) Date of Patent: Mar. 28, 2006

(54) CONTROL SYSTEM FOR ACTUATORS IN AN AIRCRAFT

(75) Inventors: Rikard Johansson, Linköping (SE); Jan Torin, Kungsbacka (SE); Kristina Ahlström, Västra Frölunda (SE)

(73) Assignee: SAAB AB, Linkoping (SE)

( * ) Notice: Subject to any disclaimer, the term of this patent is extended or adjusted under 35 U.S.C. 154(b) by 0 days.

(21) Appl. No.: 10/296,159

(22) PCT Filed: May 18, 2000

(86) PCT No.: PCT/SE01/01123

§ 371 (c)(1),
(2), (4) Date: Jul. 10, 2003

(87) PCT Pub. No.: WO01/93039

PCT Pub. Date: Dec. 6, 2001

(30) Foreign Application Priority Data

May 22, 2000 (SE) .................................. 0001910

(51) Int. Cl.
*B64C 13/36* (2006.01)

(52) U.S. Cl. .................. 244/194; 244/99.4; 700/4; 701/4; 714/11

(58) Field of Classification Search ........ 244/195–196, 244/76 R, 194, 99.4; 700/2, 4, 81, 82; 701/3, 701/4, 14, 35; 714/10, 11, 47–48, 820
See application file for complete search history.

(56) References Cited

U.S. PATENT DOCUMENTS

| | | | | |
|---|---|---|---|---|
| 4,327,437 A * | 4/1982 | Frosch et al. ................... | 714/3 |
| 4,412,281 A | 10/1983 | Works | |
| 4,622,667 A | 11/1986 | Yount | |
| 4,644,538 A * | 2/1987 | Cooper et al. ................. | 714/10 |
| 4,672,530 A | 6/1987 | Schuss | |
| 4,759,515 A * | 7/1988 | Carl ........................... | 244/76 R |
| 4,849,893 A * | 7/1989 | Page et al. ..................... | 701/3 |
| 5,377,109 A * | 12/1994 | Baker et al. .................. | 701/14 |
| 5,493,497 A * | 2/1996 | Buus ............................. | 701/4 |
| 5,550,731 A * | 8/1996 | Jackson ........................ | 700/4 |
| 5,630,053 A | 5/1997 | Morikawa | |
| 6,206,329 B1 * | 3/2001 | Gautier et al. .............. | 244/221 |

FOREIGN PATENT DOCUMENTS

| | | |
|---|---|---|
| DE | 3621106 | 1/1988 |
| DE | 3906846 | 9/1990 |
| EP | 0978777 | 2/2000 |
| FR | 2628858 | 9/1989 |
| WO | 84/00071 | 1/1984 |

* cited by examiner

*Primary Examiner*—Galen Barefoot
(74) *Attorney, Agent, or Firm*—Swidler Berlin LLP

(57) ABSTRACT

A control system for calculating control commands for actuators in an aircraft, wherein the control commands are calculated by computers distributed in the craft in dependence on input signals containing parameters that serve as the basis for said commands, wherein a computer (C) is arranged at each respective local actuator (A) and, together with the actuator (A), forms a servo node (S) where the computer (C) receives input signals via data bus (B), whereby the computer (C) in each servo node (S) calculates control commands for the local actuator (A) based on one or more sets of control laws in dependence on received parameters, and wherein the computer (C) calculates, in a corresponding manner, control commands for at least one additional actuator (A) in another servo node (S), and wherein a choice of control commands is used as the control command (7) for the actuator (A) locally in each servo node (S) in dependence on a comparison between the control commands (4) calculated locally in the servo node (S) and a control command (3) calculated for the actuator (A) in at least one other servo node (S) for the actuator (A).

19 Claims, 2 Drawing Sheets

CONTROL SYSTEM FOR ACTUATORS IN AN AIRCRAFT

TECHNICAL AREA

Figure 1:
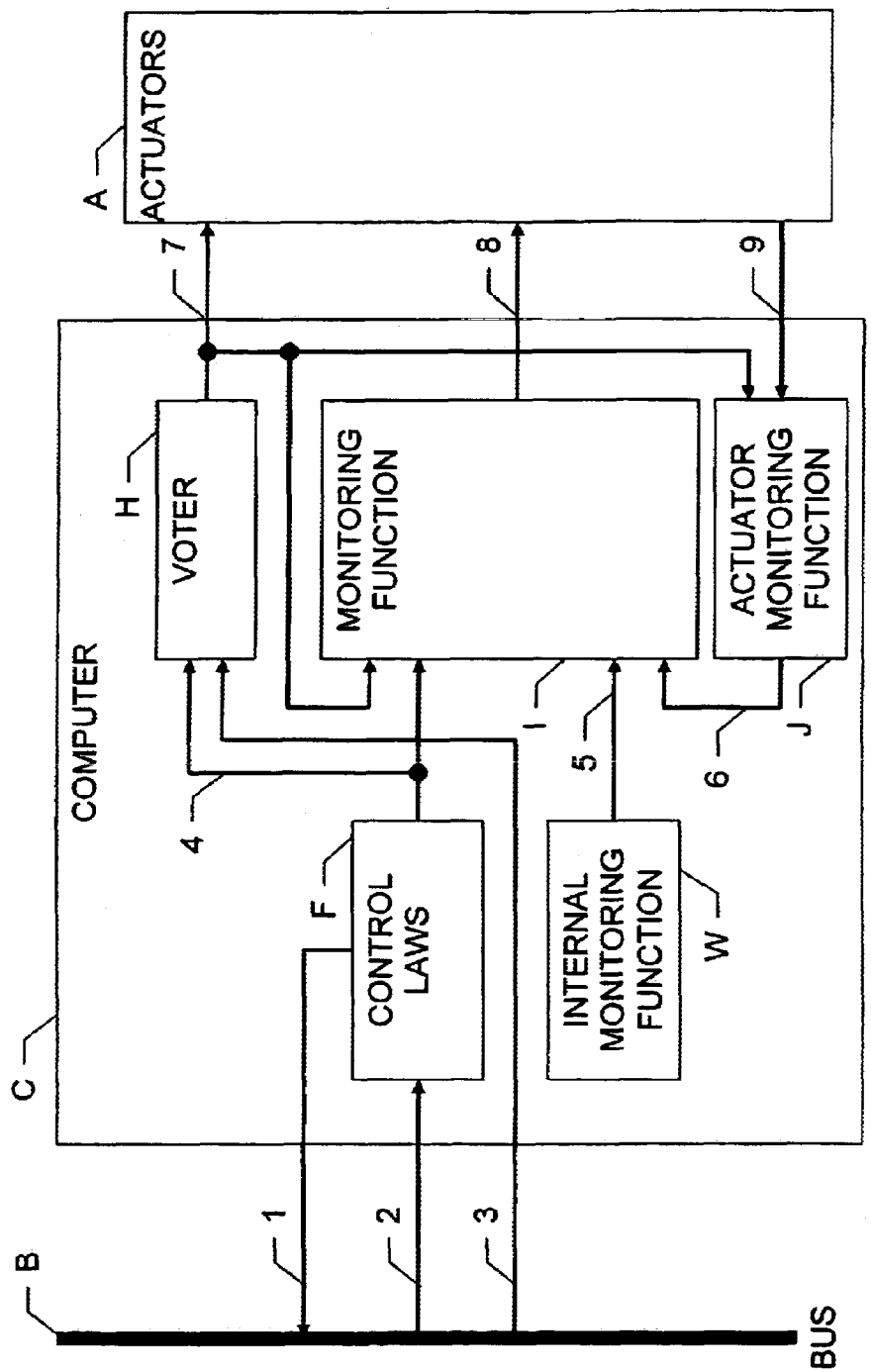

The invention concerns a device and a method for creating control commands for actuators in an aircraft, whereby the control commands are calculated in dependence on control parameters obtained from sensors and distributed to computers, wherein the control commands are calculated in accordance with control laws that apply to each actuator.

STATE OF THE ART

Systems that require control commands are described below, with such a system being exemplified by an aircraft. However, this is not a limitation, since the technology is capable of use in all types of systems where the same types of problems exist. There are a number of applications in which redundant computers are used to achieve high reliability in connection with the calculation of control commands for aircraft. One such application is found in connection with the control system for a modern aircraft, in which a "fly-by-wire" control system is used to replace the mechanical systems formerly used. The control commands for such a system are generated by means of, e.g. three redundant digital and asynchronous primary flight computers (channels); see FIG. 3. These three primary flight computers 10 are centralized to form a unit, the autopilot 11. Each channel has its own set of transmitters 12. The channels can exchange transmitter data via an internal digital link in the autopilot. Each of the autopilot channels calculates one control command for each actuator 13, which are in turn mechanically connected by a control surface. These commands are voted for in a voter 14 at each actuator in such a way that if one control command is incorrect, the other two channels can together compensate for the error that has arisen. This method, in which more than one channel controls one actuator requires that functions for solving the problem of so-called "force fight" be built into the autopilot.

Communication between the autopilot and transmitters/actuators occurs via analog or digital point-to-point communication.

A centralized control system of the type described above comprises a physical unit, the autopilot which, should it become disabled (e.g. as a result of damage during combat), causes the entire system to stop functioning. The fact that all the computing power is concentrated in one processor per channel means that there are no limits on the ways that any programming error might affect the system. In those cases where signaling between the autopilot and the actuators/transmitters occurs by analog means, the task of integrating the various units is relatively complex.

DESCRIPTION OF THE INVENTION

According to one aspect of the invention, it comprises a control system that supplies actuators in an aircraft with control commands, wherein the control commands are calculated in computers distributed in the aircraft and in dependence on input signals obtained from sensors via a data bus and containing parameters that provide the basis for calculating said commands, and wherein the system is designed so that one computer is arranged locally at each actuator, whereby the computer and its associated actuator form a servo node with a digital interface to the data bus. The computer in a servo node calculates the control commands, in accordance with control laws stored in the computer, for the local actuator in the servo node, plus the control commands for at least one additional actuator in another servo node. Locally at each actuator, a choice of control commands for the actuator is used as the control command, which choice depends on a comparison between the control command calculated locally in the servo node and the control command calculated non-locally by a computer in at least one additional servo node, which is obtained via the data bus.

The actuators can operate in two modes; one mode in which they function normally, i.e. assume their commanded positions, and another mode, a so-called "fail-safe" mode which, in the case of an aircraft, entails that the actuator permits its control surface to follow the airstream ("free-winging"). In its normal mode, the actuator will operate as long as a pulse is being sent via a special signal. If the pulse disappears, the actuator will switch over to its fail-safe mode.

The servo node computer in each servo node calculates not only the control command for its own actuator, but also the control command for one or more other servo nodes. The non-locally calculated control commands are sent via the data bus to the other servo nodes in the control system. Each servo node thus receives a number of externally-calculated control commands intended for its own actuator. These externally calculated control commands are, together with the locally, i.e. internally calculated control command calculated in the servo node itself, passed through a voter, e.g. a Mid-Level Voter, whereupon one of the control commands is selected as the actuator command and consequently used to control the actuator. This process prevents most single failures from affecting the control surface. The selected, transmitted control command and the control command calculated locally in the servo node are monitored in a monitoring unit and must, as long as no transient errors occur, be identical. If they are not, certain types of errors can be identified and rectified, e.g. via so-called double execution, i.e. in that each servo node contains a number of sets of control laws, whereby each such set produces its own control command via the servo computer. Each set of control laws uses its own set of parameters to execute the control commands. The executions of the various sets of control laws are separated in time, and occur in such a way that a transient error in, e.g. the input data will only affect the execution of one set of control laws. Whichever of the control laws produces an output signal that agrees with the command sent to the actuator can then be considered to be correct since, according to the foregoing rationale, the actuator cannot be affected by most single failures. The value of the state variables from the set of control laws that is considered to be correct is then copied to the control law/laws that calculated an incorrect control command, whereupon there are more correct sets of control laws to proceed with at the next instance of execution. Another alternative means of rectifying transient errors is to have just one set of control laws in each servo node but, in the event of an error, to copy the value of the state variables from an error-free servo node to the faulty servo node via the data bus.

The servo node also internally monitors its own function with the help of, e.g. a so-called "Watch Dog Monitor" or WDM, in a known manner. The function of the actuator is monitored by means of, e.g. a model monitor. If a fault is detected by the internal monitoring or at the actuator by the model monitor, the actuator will be commanded to assume its fail-safe mode in that a pulse will no longer be sent to the actuator. If a serious fault occurs in the servo node computer or electronics, the node will be unable to deliver any pulse, whereupon the actuator will again be switched to its fail-safe mode.

The advantages achieved using a control system according to the invention consist in that:

higher damage tolerance is achieved, since there is no central and thus critical unit;

maintenance costs will be lower, in that a complex central unit is replaced by multiple simpler and mutually interchangeable devices;

troubleshooting, fault-localization and integration of the control system units are simplified, since the servo nodes have only digital interfaces with the rest of the system.

FIGURE DESCRIPTION

FIG. 1 shows a servo node in a control system according to the invention, and its connection to the control system data bus. The figure is merely a functional depiction, and does not give a physical description of the servo node.

Figure 2:
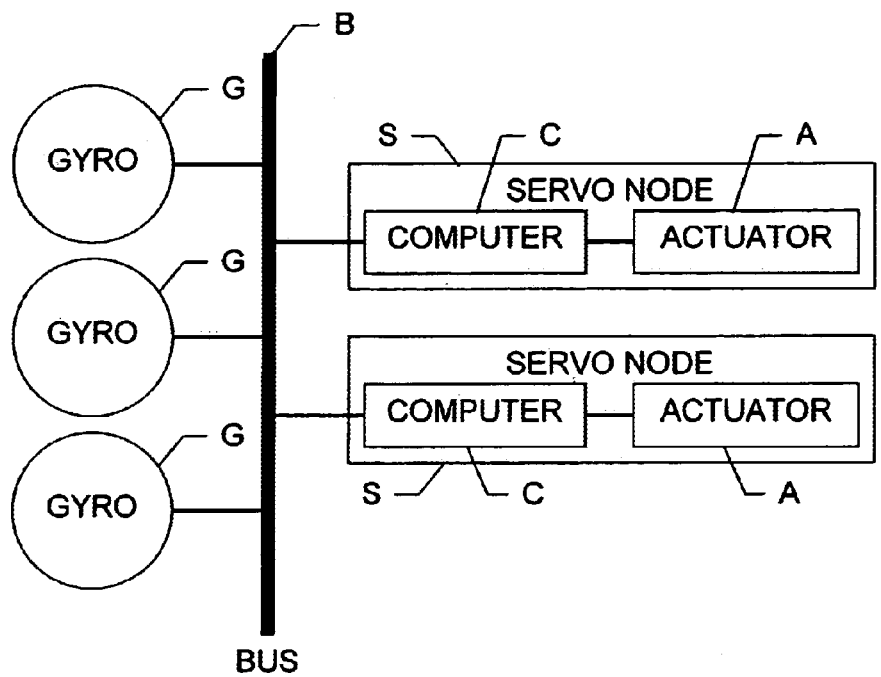

FIG. 2 provides an overview of the structure of a control system with distributed computers according to the invention, i.e. one computer function for each actuator.

Figure 3:
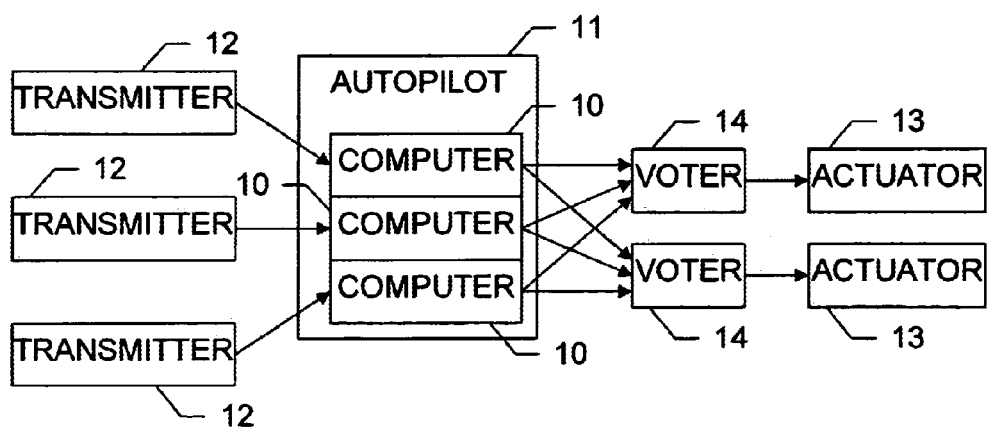

FIG. 3 illustrates a control system according to the prior art with three primary control computers arranged centrally, and wherein the computers are arranged in parallel for redundancy.

DESCRIPTION OF EMBODIMENTS

A number of embodiments of the invention are described below with reference to the accompanying figures.

FIG. 2 provides an overview of a number of actuators A distributed throughout an aircraft. The actuators A have the purpose of executing a control maneuver, such as actuating a valve or controlling an engine, an electrical machine, a relay, a rudder surface or some other corresponding actuatable device. The actuators A are controlled by means of computers C, which are deployed in servo nodes (S). Each computer C contains stored control laws for calculating control commands for the actuator A in the servo node node (S) to which said computer belongs, and for at least one additional actuator A in another servo node (S). The control of the actuator A is determined by parameters that are obtained via sensors G in the system. The sensors G can consist of miscellaneous data transmitters such as speed indicators, temperature gages, pressure gages, steering controls, etc. The aforesaid sensor parameters are digitally transmitted as data via a data bus B, whereby all the servo nodes (S) in the system have access to exactly the same sensor data. The computer C in each servo node (S) can thus calculate, based on received sensor data, a control command for the actuator A in its own servo node and for at least one actuator A in another servo node (S), based on control laws programmed into the computer C.

A servo node in the control system is described separately in FIG. 1, where the servo node contains a computer C that is connected to the actuator A. All sensor data (2) are sent to the computer C via the data bus B. These data are used by the control laws F to calculate at least two local control commands (4) according to the double-execution principle, or just one control command (4) in the event that double-execution is no longer intended to be used. One control command (1) is calculated for at least one additional actuator in another servo node (S). The control command/commands (4) calculated locally by the servo node for itself is/are voted on together with a number of non-locally calculated control commands (3) for its actuator A in a voter H, e.g. a "Mid-Level-Voter". The resulting control command (7) is used to control the actuator A. The selected actuator command (7) and the local control command/commands (4) are monitored by a monitoring function I. If the locally calculated control command/commands (4) do not agree perfectly with the actuator command (7), one of the following actions is carried out:

If double-execution is used: determine which of the local control commands (4) is correct. The state variables for the set of control laws for the correct control command are copied to the sets of control laws that calculated an incorrect control command.

If double-execution is not used: the state variables are copied from a correctly functioning servo node (S) to the malfunctioning servo node (S) via the data bus.

In either case, the correct local control command/commands (4) is/are obtained at the next point of execution, assuming that no transient faults occur. If, for any reason, it is not possible to cope with the transient fault, the non-locally calculated control commands (3) may, as a first option, be used to control the actuator A. If this is not possible either, the actuator A will be put into its fail-safe mode in that the pulsed signal will cease. The monitoring function I will then also stop sending the pulsed signal (8) if the internal monitoring function W in the computer has detected any faults. The internal monitoring function W is designed in such a way that it has a high probability of being able to detect if the computer C is not functioning in the intended way; such monitoring can be realized by using a "Watch-Dog-Monitor" in a known manner. The monitoring function I also stops sending the pulsed signal (8) if the actuator monitoring function J detects that the actuator is not behaving in the expected way; this an be realized via a so-called "model monitor" in a known manner, based on the actuator commands and certain parameters from the actuator (9).

Other servo nodes (S) in the control system function in the manner described above. The signals that are mediated to the respective servo computers are digital. The various servo nodes (S) work in synchrony.

What is claimed is:

1. A control system for actuators in an aircraft, whereby control commands for the actuators are calculated by computers distributed in the aircraft and where each computer is arranged to receive sensor parameters via a data bus and to calculate control commands for a first actuator and for at least one additional actuator in dependence on received sensor parameters, wherein:

each computer is connected to and controls only one actuator and, together with the actuator, forms a servo node with a digital interface to the data bus, the computer in each servo node is arranged to receive, via the data bus, control commands for the actuator determined by a computer in at least one additional servo node, the computer in the at least one additional servo node connected to and controlling a different actuator than the actuator in the servo node and not connected to the actuator in the servo node, the computer in each servo node is arranged to select an executive control command for the actuator in the servo node in dependence on a comparison between the control commands calculated locally in the servo node and the control commands received via the data bus, the computer is arranged to control the actuator in the servo node by means of the executive control command.

2. A control system according to claim 1, wherein the computer in the servo node contains programs with control laws for calculating control commands for the actuator in its own servo node, plus control laws for calculating control commands for actuators in at least one other servo node.

3. A control system according to claim 2, wherein each servo node contains a voting function for calculating an executive control command for the actuator based on both the control commands calculated locally in the servo node itself and on control commands calculated in at least one other servo node.

4. A control system according to claim 3, wherein a monitoring function in the servo node receives the executive control command and the locally calculated control commands and compares these control commands, which must be identical.

5. A control system according to claim 4, wherein, as long as no fault is present, the monitoring unit transmits a pulsed control signal to the actuator, whereupon the pulsed control signal must be present at the actuator in order for a control command to be executable, so that if the pulsed control signal ceases, the actuator will be set to its fail-safe mode.

6. A control system according to claim 5, wherein the computer in a servo node contains an internal monitoring function that monitors the computer functionality and, in the event of a fault, sends information to the monitoring unit, whereupon the pulsed control signal is not transmitted, which causes the actuator to be set to its fail-safe mode.

7. A control system according to claim 6, wherein the function of the actuator is monitored by a model monitor that detects any malfunction of the actuator, whereby the monitoring unit obtains information about the fault, whereupon the pulsed signal is terminated and the actuator is set to its fail-safe mode.

8. A control system according to claim 1, wherein the computer contains multiple sets of control laws and compares the control commands calculated in locally in the servo node via double-execution with the actuator command selected by voting, whereupon, in the event that the commands are not exactly identical, the control commands calculated in at least one other servo node are used to determine which of the locally calculated control commands is correct.

9. A control system according to claim 8, wherein the values of the state parameters in the control laws that produced the correct local control command are copied to the set of control laws that failed to produce a correct control command.

10. A control system according to claim 1, wherein the computer contains a set of control laws and compares the control command calculated locally in the servo node with the actuator command selected by voting, whereupon, in the event that the commands are not exactly identical, the value of the state parameters of the control laws in a fault-free servo node is copied to the state parameters in the control laws in the faulty servo node.

11. A control system according to claim 1, wherein the control system signals are exclusively digital in nature, and in that the signals in the system are mediated via a data bus.

12. A control system according to claim 11, wherein the data bus is a logical "broadcast" bus or a star-configured bus.

13. A control system according to claim 1, wherein the servo nodes in the control system work in synchrony.

14. A control system according to claim 2, wherein the control system is used in an airplane, in that the sensors contain gyros for detecting roll rate as well as speed indicators, and in that the actuators are used to operate control surfaces.

15. A control system comprising:
a plurality of servo nodes, each servo node comprising:
one actuator in the servo node; and
a computer arranged at the actuator in the servo node, operatively coupled only to the actuator in the servo node and operable to receive sensor parameters over a data bus, to calculate a control command for the actuator in the servo node, to calculate a control command for an actuator in another of the plurality of servo nodes, to receive a control command for the actuator in the servo node, to select a control command based on a comparison of the control command calculated by the servo node for the actuator in the servo node and the received control command, and to control the actuator using the selected control command.

16. The control system of claim 15, wherein the computer in each servo node is operable to calculate the control command for the actuator in the servo node based on control laws and to calculate the control command for an actuator in another of the plurality of servo nodes based on control laws.

17. The control system of claim 16, wherein the computer in each servo node is operable to select the control command based on a voting function.

18. The control system of claim 17, wherein the computer in each servo node is further operable to compare the selected control command with the calculated control command for the actuator in the servo node and to determine that there is a fault if the selected control command is not identical to the calculated control command for the actuator in the servo node.

19. The control system of claim 18, wherein the computer in each servo node is operable to transmit a pulsed control signal to the actuator and the actuator is operable to execute a control command if the pulsed control signal is present and to set to a fail-safe mode if the pulsed control signal is not present.

* * * * *